United States Patent
Lin et al.

(10) Patent No.: US 12,025,451 B2
(45) Date of Patent: Jul. 2, 2024

(54) METHOD AND DEVICE FOR LOCATING OBSTACLE IN SEMANTIC MAP, COMPUTER APPARATUS, AND STORAGE MEDIUM

(71) Applicants: WERIDE CORP, San Jose, CA (US); GUANGZHOU WERIDE TECHNOLOGY LIMITED COMPANY, Guangzhou (CN)

(72) Inventors: Xuanzhu Lin, Guangzhou (CN); Hua Zhong, Guangzhou (CN); Xu Han, Guangzhou (CN)

(73) Assignees: WERIDE CORP, San Jose, CA (US); GUANGZHOU WERIDE TECHNOLOGY LIMITED COMPANY, Guangzhou (CN)

( * ) Notice: Subject to any disclaimer, the term of this patent is extended or adjusted under 35 U.S.C. 154(b) by 363 days.

(21) Appl. No.: 17/412,958

(22) Filed: Aug. 26, 2021

(65) Prior Publication Data

US 2021/0390730 A1   Dec. 16, 2021

Related U.S. Application Data

(63) Continuation of application No. PCT/CN2019/126327, filed on Dec. 18, 2019.

(30) Foreign Application Priority Data

Feb. 26, 2019 (CN) .......................... 201910142666.3

(51) Int. Cl.
   *G01C 21/34* (2006.01)
   *G06T 7/20* (2017.01)
   (Continued)

(52) U.S. Cl.
   CPC ............ *G01C 21/3453* (2013.01); *G06T 7/20* (2013.01); *G06T 7/70* (2017.01); *G06V 10/22* (2022.01); *G06V 20/00* (2022.01)

(58) Field of Classification Search
   CPC ......... G01C 21/3453; G06T 7/20; G06T 7/70; G06V 10/22; G06V 20/00; G05D 1/0274
   See application file for complete search history.

(56) References Cited

U.S. PATENT DOCUMENTS

| 10,809,076 | B2* | 10/2020 | Pollock | ............... G01C 21/3407 |
| 2010/0079769 | A1* | 4/2010 | Chen | ..................... G01B 11/24 |
| | | | | 356/601 |
| 2019/0383941 | A1* | 12/2019 | Siddiqui | ................. G01S 17/89 |

FOREIGN PATENT DOCUMENTS

| CN | 104869634 A | 8/2015 |
| CN | 106503653 A | 3/2017 |

(Continued)

OTHER PUBLICATIONS

International Search Report of PCT/CN2019/126327, p. 1-4, dated Mar. 19, 2020.

(Continued)

*Primary Examiner* — Tom Y Lu
(74) *Attorney, Agent, or Firm* — George R. McGuire; Bond, Schoeneck & King PLLC (57) ABSTRACT

Provided are a method and apparatus for locating an obstacle in a semantic map, a computer device, and a storage medium. The method includes: acquiring obstacle coordinates of an obstacle and a travel velocity of the obstacle; selecting an initial region in the semantic map according to a preset selection radius and according to the obstacle coordinates; and performing screening on a plurality of waypoints in the initial region by using a preset screening rule so as to obtain a target waypoint matching a position of (Continued)

the obstacle in the semantic map, and using the target waypoint as the position of the obstacle in the semantic map.

6 Claims, 4 Drawing Sheets

(51) Int. Cl.
    *G06T 7/70*     (2017.01)
    *G06V 10/22*     (2022.01)
    *G06V 20/00*     (2022.01)

(56) References Cited

FOREIGN PATENT DOCUMENTS

| | | |
|---|---|---|
| CN | 107588778 A | 1/2018 |
| CN | 109147317 A | 1/2019 |
| CN | 109284348 A | 1/2019 |
| CN | 110032181 A | 7/2019 |
| JP | 2014182590 A | 9/2014 |
| KR | 101716973 B1 | 3/2017 |

OTHER PUBLICATIONS

Chinese Office Action of 201910142666.3, dated Aug. 11, 2021, pp. 1-5.

\* cited by examiner

METHOD AND DEVICE FOR LOCATING OBSTACLE IN SEMANTIC MAP, COMPUTER APPARATUS, AND STORAGE MEDIUM

CROSS-REFERENCE TO RELATED APPLICATION

This is a continuation of International Patent Application No. PCT/CN2019/126327, filed on Dec. 18, 2019, which is based on and claims priority to a Chinese Patent Application No. CN201910142666.3 filed on Feb. 26, 2019, disclosures of which are incorporated herein by reference in their entireties.

TECHNICAL FIELD

The present application relates to the technical field of automatic driving, for example, a method and apparatus for locating an obstacle in a semantic map, a computer device, and a storage medium.

BACKGROUND

With the rapid development of science and technology, an autonomous driving technology is also developing faster and faster and constantly used in all walks of life.

In the process of automatic driving, a vehicle often uses a preset high-precision map such as a semantic map to know road conditions and perform driving navigation according to the road conditions. Therefore, it is necessary to locate obstacles such as vehicles and pedestrians in the semantic map so as to identify the positions of obstacles and determine a navigation strategy. Thus, it is particularly important to accurately locate the obstacles in the semantic map. People typically detect the obstacles with sensors such as taking pictures with cameras or detecting the obstacles to find out the specific positions of the obstacles in combination with radar. The location of the obstacles in the semantic map is achieved through coordinate transformation of the specific positions.

However, the traditional manner of locating the obstacles in the semantic map has low accuracy.

SUMMARY

In view of this, the present application provides a method and apparatus for locating an obstacle in a semantic map, a computer device, and a storage medium that can improve the locating accuracy in the semantic map.

An embodiment of the present application provides a method for locating an obstacle in a semantic map. The method includes the steps described below.

Obstacle coordinates of the obstacle and a travel velocity of the obstacle are acquired, where the obstacle coordinates are configured to characterize a position of the obstacle on an actual road.

An initial region is selected in the semantic map according to a preset selection radius and according to the obstacle coordinates, where a plurality of waypoints configured to characterize a road distribution state in the initial region are included in the initial region.

Screening is performed on the plurality of waypoints in the initial region by using a preset screening rule so as to obtain a target waypoint matching a position of the obstacle in the semantic map, and the target waypoint is used as the position of the obstacle in the semantic map, where the screening rule is a rule for performing the screening on the plurality of waypoints according to at least one of the travel velocity of the obstacle, directions of road segments on which the plurality of waypoints are located, distances between the plurality of waypoints and the obstacle coordinates, distances between the plurality of waypoints, or a connectivity relationship between the plurality of waypoints.

In an embodiment, the screening rule includes at least one of the steps described below.

A first waypoint is deleted, where the first waypoint is located on a first road segment, and an included angle between a direction of the first road segment and a direction of a travel velocity of the obstacle is greater than a preset angle threshold is deleted.

Another waypoint other than a second waypoint closest to the obstacle on each road segment is deleted.

Another waypoint other than a third waypoint closest to the obstacle of two interconnected waypoints on a plurality of road segments is deleted.

A fourth waypoint other than the second waypoint on each road segment is deleted, where a difference between a distance from the fourth waypoint to the obstacle and a distance between the second waypoint to the obstacle is greater than half a width of the road.

In an embodiment, the method further includes the steps described below.

It is determined whether target waypoints in a contour of the obstacle belong to a same road.

In response to the target waypoints included in the contour of the obstacle belonging to the same road, the target waypoints included in the contour of the obstacle are used as the position of the obstacle in the semantic map.

In an embodiment, the step of determining whether the target waypoints in the contour of the obstacle belong to the same road includes the steps described below.

Vertical distances from the target waypoints to the contour of the obstacle are determined according to the contour of the obstacle and positions of the target waypoints.

In response to a difference between the vertical distances from the target waypoints to the contour of the obstacle being less than or equal to a preset distance difference threshold, it is determined that the target waypoints belong to the same road.

In response to the difference between the vertical distances from the target waypoints to the contour of the obstacle being greater than the preset distance difference threshold, it is determined that the target waypoints belong to different roads.

In an embodiment, the plurality of waypoints are stored by using a data structure of a k-dimensional (KD) tree.

In an embodiment, the step of acquiring the obstacle coordinates of the obstacle and the travel velocity of the obstacle includes the steps described below.

Point cloud data of the obstacle is acquired.

The point cloud data is identified by using a preset identification model so as to determine the obstacle coordinates and the travel velocity of the obstacle, where the identification model is a model based on machine learning and an identification rule.

In an embodiment, after acquiring the point cloud data of the obstacle, the method further includes the step described below.

The point cloud data is identified by using the identification model so as to determine the contour of the obstacle.

An embodiment of the present application provides an apparatus for locating an obstacle in a semantic map. The apparatus includes an acquisition module, a selection module, and a processing module.

The acquisition module is configured to acquire obstacle coordinates of the obstacle and a travel velocity of the obstacle, where the obstacle coordinates are configured to characterize a position of the obstacle on an actual road.

The selection module is configured to select an initial region in the semantic map according to a preset selection radius and according to the obstacle coordinates, where a plurality of waypoints configured to characterize a road distribution state in the initial region are included in the initial region.

The processing module is configured to perform screening on the plurality of waypoints in the initial region by using a preset screening rule so as to obtain a target waypoint matching a position of the obstacle in the semantic map and configured to use the target waypoint as the position of the obstacle in the semantic map, where the screening rule is a rule for performing the screening on the plurality of waypoints according to at least one of the travel velocity of the obstacle, directions of road segments on which the plurality of waypoints are located, distances between the plurality of waypoints and the obstacle coordinates, distances between the plurality of waypoints, or a connectivity relationship between the plurality of waypoints.

An embodiment of the present application provides a computer device including a memory and a processor. The memory is configured to store computer programs. The processor is configured to, when executing the computer programs, implement the steps described below.

Obstacle coordinates of the obstacle and a travel velocity of the obstacle are acquired, where the obstacle coordinates are configured to characterize a position of the obstacle on an actual road.

An initial region is selected in the semantic map according to a preset selection radius and according to the obstacle coordinates, where a plurality of waypoints configured to characterize a road distribution state in the initial region are included in the initial region.

Screening is performed on the plurality of waypoints in the initial region by using a preset screening rule so as to obtain a target waypoint matching a position of the obstacle in the semantic map, and the target waypoint is used as the position of the obstacle in the semantic map, where the screening rule is a rule for performing the screening on the plurality of waypoints according to at least one of the travel velocity of the obstacle, directions of road segments on which the plurality of waypoints are located, distances between the plurality of waypoints and the obstacle coordinates, distances between the plurality of waypoints, or a connectivity relationship between the plurality of waypoints.

An embodiment of the present application provides a computer-readable storage medium having computer programs stored thereon, where when the computer programs are executed by a processor, the steps described below are implemented.

Obstacle coordinates of the obstacle and a travel velocity of the obstacle are acquired, where the obstacle coordinates are configured to characterize a position of the obstacle on an actual road.

An initial region is selected in the semantic map according to a preset selection radius and according to the obstacle coordinates, where a plurality of waypoints configured to characterize a road distribution state in the initial region are included in the initial region.

Screening is performed on the plurality of waypoints in the initial region by using a preset screening rule so as to obtain a target waypoint matching a position of the obstacle in the semantic map, and the target waypoint is used as the position of the obstacle in the semantic map, where the screening rule is a rule for performing the screening on the plurality of waypoints according to at least one of the travel velocity of the obstacle, directions of road segments on which the plurality of waypoints are located, distances between the plurality of waypoints and the obstacle coordinates, distances between the plurality of waypoints, or a connectivity relationship between the plurality of waypoints.

According to the method and apparatus for locating an obstacle in a semantic map, a computer device, and a storage medium, the obstacle coordinates of the obstacle and the travel velocity of the obstacle are acquired through the computer device, the initial region is selected in the semantic map according to the preset selection radius and according to the obstacle coordinates, the screening is performed on the plurality of waypoints in the initial region by using the preset screening rule so as to obtain the target waypoint matching the position of the obstacle in the semantic map, and the target waypoint is used as the position of the obstacle in the semantic map. In this manner, the location of the obstacle in the semantic map is achieved. The obstacle coordinates are configured to characterize the position of the obstacle on an actual road. The initial region includes the plurality of waypoints configured to characterize the road distribution state in the initial region. The screening rule is a rule according to at least one of the travel velocity of the obstacle, directions of road segments on which the waypoints are located, distances between the waypoints and the obstacle coordinates, distances between the waypoints, or a connectivity relationship between the waypoints. Thus, according to the method, screening can be performed on the waypoints by the computer device according to at least one of the travel velocity of the obstacle, directions of the road segments on which the waypoints are located, distances between the waypoints and the obstacle coordinates, distances between the waypoints, or a connectivity relationship between the waypoints so as to obtain the target waypoint and achieve location of the obstacle in the semantic map, making the location result of the obstacle in the semantic map more reasonable, accurate and reliable. In this manner, the driving strategy generated according to the semantic map is more accurate in the process of automatic driving.

DETAILED DESCRIPTION

The present application is described below in detail with reference to the drawings and embodiments. It is to be understood that the embodiments described herein are intended to explain the present application and not to limit the present application.

Figure 1:
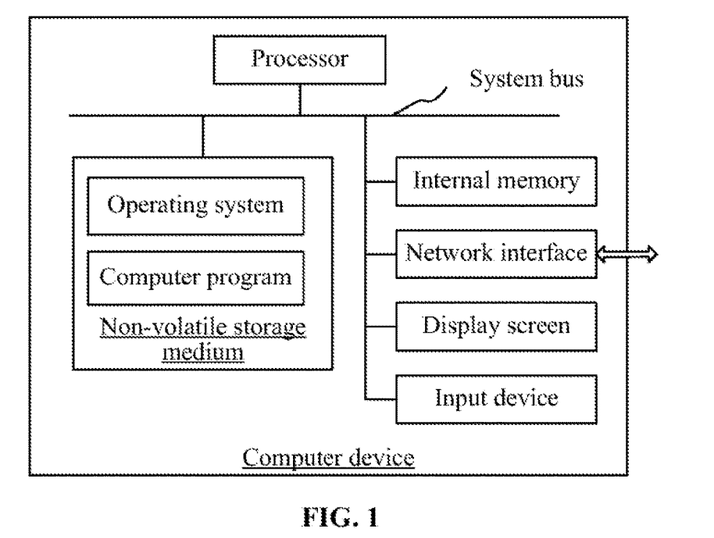
FIG. 1 is an internal structure diagram of a computer device according to an embodiment.

The method for locating an obstacle in a semantic map provided in the present application can be applied to the computer device shown in FIG. 1. The computer device includes a processor, a memory, a network interface, a display screen and an input device which are connected via a system bus. The processor of the computer device is configured to provide computing and control capabilities. The memory of the computer device includes a non-volatile storage medium and an internal memory. The non-volatile storage medium stores an operating system, computer programs, and a database. The internal memory provides an environment for running the computer programs and the operating system in the non-volatile storage medium. The database of the computer device is configured to store a screening rule in the embodiments described below. For a specific description of the screening rule, see the specific description in the embodiments described below. The network interface of the computer device may be configured to communicate with an external device through a network connection. Optionally, the computer device may be a server, a desktop computer, or a personal digital assistant, may be another terminal device such as a tablet computer and a mobile phone, and may also be a cloud or remote server. The specific form of the computer device is not limited in the embodiments of the present application. The display screen of the computer device may be a liquid crystal display screen or an electronic ink display screen. The input device of the computer device may be a touch layer covered on the display screen, may be a key, a trackball, or a touch pad disposed on a shell of the computer device, or may be an externally connected keyboard, touch pad, mouse, or the like. Of course, neither the input device nor the display screen may be part of the computer device; the input device and the display screen may be devices externally connected to the computer device. It is to be understood by those skilled in the art that the structure illustrated in FIG. 1 is merely a block diagram of a part of structures related to the solutions of the present application and does not limit the computer device to which the solutions of the present application are applied, and a specific computer device may include more or fewer components than those illustrated in FIG. 1, or may be a combination of some components, or may have different layout of components.

The technical solutions of the present application and how the technical solutions of the present application solve the above technical problems are described in detail in the embodiments described below. The embodiments described below may be combined with each other, and identical or similar concepts or processes may not be repeated in some embodiments. The embodiments of the present application are described below in conjunction with the drawings.

It is to be noted that the execution subject is an apparatus for locating an obstacle in a semantic map in the method embodiment described below, and the apparatus may be implemented as part or all of the computer device by means of software, hardware, or a combination of software and hardware. The method embodiment is illustrated by using an example in which the execution subject is the computer device.

Figure 2:
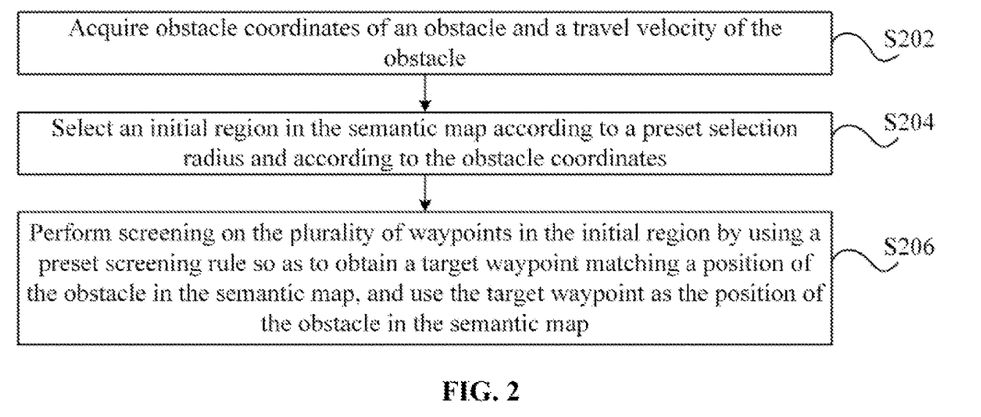
FIG. 2 is a flowchart of a method for locating an obstacle in a semantic map according to an embodiment.

FIG. 2 is a flowchart of a method for locating an obstacle in a semantic map according to an embodiment. This embodiment relates to the specific process of locating an obstacle in a semantic map by the computer device according to a position of the obstacle. As shown in FIG. 2, the method includes the steps described below.

In S202, obstacle coordinates of an obstacle and a travel velocity of the obstacle are acquired. The obstacle coordinates are configured to characterize a position of the obstacle on an actual road.

In some embodiments, the computer device can acquire the obstacle coordinates of the obstacle, and the obstacle coordinates can characterize the specific position of the obstacle on the actual road. Optionally, the obstacle may be detected by a laser radar so as to obtain point cloud data of the obstacle, and the point cloud data is then analyzed according to a preset identification rule so as to obtain the obstacle coordinates and the travel velocity of the obstacle; the point cloud data may also be identified by using a machine learning method, and the point cloud data may also be identified by using the method of combining the machine learning and the identification rule so as to obtain the obstacle coordinates and the travel velocity of the obstacle, which is not limited in this embodiment. Optionally, the obstacle may be a vehicle or a pedestrian.

In S204, an initial region is selected in the semantic map according to a preset selection radius and according to the obstacle coordinates. The initial region includes a plurality of waypoints configured to characterize a road distribution state in the initial region.

In some embodiments, the computer device selects an initial region in the semantic map by using the obstacle coordinates as the center of the circle and the preset selection radius as the basis of a selection range. Optionally, the initial region may be a circle or of another shape such as a square, which is not limited in this embodiment. It is to be noted that the semantic map is a high-precision map marked with waypoints and actual information of various roads. Thus, the above initial region of the obstacle may include the road distribution state of the region where the obstacle is located, and the road distribution state of the region where the obstacle is located is characterized by a plurality of waypoints.

In S206, screening is performed on the plurality of waypoints in the initial region by using a preset screening rule so as to obtain a target waypoint matching a position of the obstacle in the semantic map, and the target waypoint is used as the position of the obstacle in the semantic map. The screening rule is a rule for performing the screening on the waypoints according to at least one of the travel velocity of the obstacle, directions of the waypoints, distances between the waypoints and the obstacle coordinates, distances between the waypoints, or a connectivity relationship between the waypoints. The directions of the waypoints refer to the direction of the road segments on which the waypoints are located.

In some embodiments, the computer device is capable of performing screening on a plurality of waypoints in the initial region by using a preset screening rule which may optionally be a one-time screening or a step-by-step level-by-level screening, which is not limited in this embodiment. The screening rule is the rule for performing the screening on the waypoints according to at least one of the travel velocity of the obstacle, the directions of the waypoints, the distances between the waypoints and the obstacle coordinates, the distances between the waypoints, or the connectivity relationship between the waypoints. Therefore, the computer device uses the screening rule to perform the screening on the plurality of road segments in the initial region so as to obtain a screened target waypoint. Optionally, the road may be divided into a plurality of road segments, and each road segments may be a straight line or a curved line. When the road segment is a straight line, the direction of the road segment refers to the direction of the straight line; and when the road segment is a curved line, the direction of the road segment refers to the direction of tangent of the waypoint on the curved line. Optionally, one target waypoint or a plurality of target waypoints may be obtained, which is not limited in this embodiment. The computer device determines the target waypoint as the position of the obstacle in the semantic map, thereby achieving the location of the obstacle in the semantic map.

In this embodiment, the computer device is capable of acquiring the obstacle coordinates of the obstacle and the travel velocity of the obstacle, selecting the initial region in the semantic map according to the preset selection radius and according to the obstacle coordinates, performing the screening on the plurality of waypoints in the initial region by using the preset screening rule so as to obtain the target waypoint matching the position of the obstacle in the semantic map, and using the target waypoint as the position of the obstacle in the semantic map. Thus, the location of the obstacle in the semantic map is achieved. The obstacle coordinates are configured to characterize the position of the obstacle on an actual road. The initial region includes the plurality of waypoints configured to characterize the road distribution state in the initial region. The screening rule is a rule according to at least one of the travel velocity of the obstacle, directions of the waypoints, distances between the waypoints and the obstacle coordinates, distances between the waypoints, or a connectivity relationship between the waypoints. Thus, according to the method, screening can be performed on the waypoints by the computer device according to at least one of the travel velocity of the obstacle, directions of the waypoints, distances between the waypoints and the obstacle coordinates, distances between the waypoints, or a connectivity relationship between the waypoints so as to obtain the target waypoint and achieve location of the obstacle in the semantic map, making the location result of the obstacle in the semantic map more reasonable, accurate and reliable. In this manner, the driving strategy generated according to the semantic map is more accurate in the process of automatic driving.

In an embodiment, the screening rule includes at least one of the following steps: deleting a first waypoint whose included angle with a direction of the travel velocity of the obstacle is greater than a preset angle threshold; deleting another waypoint other than a second waypoint closest to the obstacle on each road segment; deleting another waypoint other than a third waypoint closest to the obstacle of two interconnected waypoints on a plurality of road segments; or deleting a fourth waypoint other than the second waypoint on each road segment, wherein a difference between a distance from the fourth waypoint to the obstacle and a distance between the second waypoint to the obstacle is greater than half a width of the road.

In some embodiments, the screening rule may include one or more of the preceding steps of deleting a waypoint. The first waypoint whose included angle with the direction of the travel velocity of the obstacle is greater than the preset angle threshold is deleted so that the computer device can delete the waypoint whose road direction is inconsistent with the direction of the travel velocity of the obstacle; for example, the road direction of the waypoint is the opposite to the travel direction of the obstacle or the road direction of the waypoint refers to the turning direction when the obstacle goes straight. For example, the preset angle threshold may be 150 degrees or another angle, as long as it can be characterized that the road direction of the waypoint is inconsistent with the direction of the travel velocity of the obstacle. Another waypoint other than the second waypoint closest to the obstacle on each road segment is deleted so that the computer device can delete a point farther away from the obstacle and merely a nearest point is retained to make the location more accurate. Another waypoint other than the third waypoint closer to the obstacle of two interconnected waypoints on the plurality of road segments is deleted so that the computer device can delete a point farther away from the obstacle from the two interconnected waypoints on the plurality of road segments. Since the two interconnected waypoints can reach each other, retaining the point closer to the obstacle of the two interconnected waypoints can make the location more accurate. The fourth waypoint other than the second waypoint in each road segment is deleted so that location on an adjacent rode segment can be avoided and the location accuracy is improved, where a difference between a distance from the fourth waypoint to the obstacle and a distance between the second waypoint to the obstacle is greater than half a width of the road.

It is to be noted that when the screening rule includes a plurality of steps among the preceding steps, this embodiment does not specifically limit the execution order of the plurality of steps. The target waypoint can be obtained by executing the plurality of steps in any order under reasonable circumstances. For example, the first waypoint whose included angle with the direction of the travel velocity of the obstacle is greater than the preset angle threshold is first deleted, another waypoint other than the second waypoint closest to the obstacle on each road segment is then deleted, and another waypoint other than the third waypoint closest to the obstacle of two interconnected waypoints on the plurality of road segments is then deleted; alternatively, another waypoint other than the waypoint closest to the obstacle from waypoints connecting with each other on each road segment is first deleted, the waypoint whose included angle with the direction of the travel velocity of the obstacle is greater than the preset angle threshold is then deleted, and another waypoint other than the point closest to the obstacle on each road segment is then deleted. The execution order is not limited in this embodiment.

In this embodiment, the computer device is capable of deleting the first waypoint whose included angle with the direction of the travel velocity of the obstacle is greater than the preset angle threshold; deleting another waypoint other than the second waypoint closest to the obstacle on each road segment, deleting another waypoint other than the third waypoint closer to the obstacle of two interconnected waypoints on the plurality of road segments, and deleting the fourth waypoint other than the second waypoint on each road segment, where the difference between a distance from the fourth waypoint to the obstacle and a distance between the second waypoint to the obstacle is greater than half a width of the road. Through one or a combination of any of these steps, a waypoint that does not accord with the driving state of the obstacle is deleted and a target waypoint matching the driving state of the obstacle is retained so that location of the obstacle in the semantic map is achieved, the location result is more reasonable, accurate and reliable, and the driving strategy generated according to the semantic map in the automatic driving process is more accurate.

Figure 3:
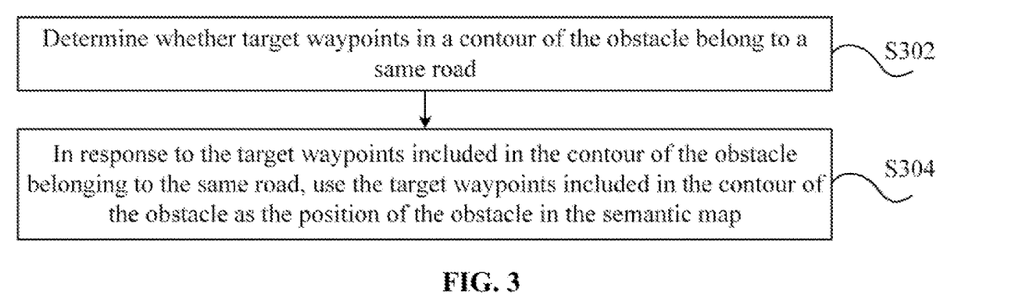
FIG. 3 is a flowchart of a method for locating an obstacle in a semantic map according to another embodiment.

FIG. 3 is a flowchart of a method for locating an obstacle in a semantic map according to another embodiment. This embodiment relates to the specific process of locating an obstacle in a semantic map by the computer device according to a contour of the obstacle. On the basis of the various preceding embodiments, as shown in FIG. 3, the method may further include the step described below.

In S302, it is determined whether target waypoints in a contour of the obstacle belong to a same road.

In some embodiments, the computer device may acquire the contour of the obstacle and then determine whether the target waypoints in the region in the contour of the obstacle belong to the same road according to waypoint information carried in the semantic map. It is to be noted that determining whether a plurality of waypoints belong to the same road is to determine whether the plurality of waypoints are in one lane of a road. The road may generally include a plurality of lanes, and each lane may characterize the road in the present application. For example, Huaihai road is a two-way eight-lane road, and the four lanes are a first left road, a second left road, a second right road, and a first right road from left to right in the driving direction from east to west; the first left road, the second left road, the second right road, and the first right road are all independent roads.

Figure 4:
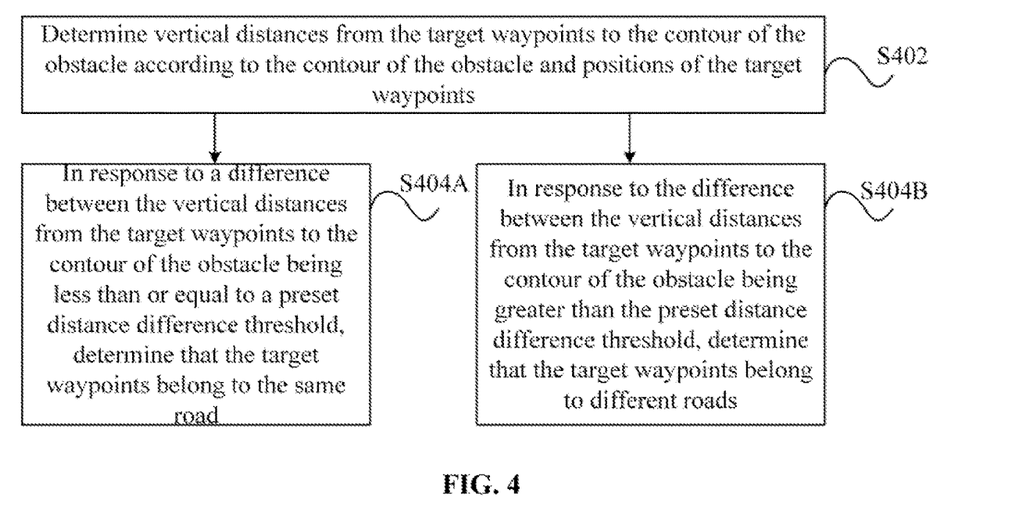
FIG. 4 is a flowchart of a method for locating an obstacle in a semantic map according to another embodiment.

Optionally, step S302 may be implemented as shown in FIG. 4 and may specifically include the steps described below.

In S402, vertical distances from the target waypoints to the contour of the obstacle are determined according to the contour of the obstacle and positions of the target waypoints.

In some embodiments, the computer device may determine the vertical distances from the target waypoints to the contour of the obstacle according to the contour of the obstacle and positions of the screened target waypoints in the semantic map and compare the differences between various vertical distances and a preset distance difference threshold. It is to be noted that the vertical distance may be the distance in the direction perpendicular to the direction of a road, that is, the direction of the road refers to the driving direction of the vehicle on the road, that is to say, the left and right directions of the driver when the vehicle travels on the road.

In S404A, in response to a difference between the vertical distances from the target waypoints to the contour of the obstacle being less than or equal to a preset distance difference threshold, it is determined that the target waypoints belong to the same road.

In some embodiments, in response to the difference between the vertical distances from the target waypoints to the contour of the obstacle being less than or equal to the preset distance difference threshold, the computer device determines that the difference between the vertical distances from the target waypoints to the contour of the obstacle is relatively small and thus determine that the target waypoints belong to the same road.

In S404B, in response to the difference between the vertical distances from the target waypoints to the contour of the obstacle being greater than the preset distance difference threshold, it is determined that the target waypoints belong to different roads.

In some embodiments, in response to the difference between the vertical distances from the target waypoints to the contour of the obstacle being greater than the preset distance difference threshold, the computer device determines that the difference between the vertical distances from the target waypoints to the contour of the obstacle is relatively large and thus determines that the target waypoints do not belong to the same road and may belong to different roads.

In the implementation as shown in FIG. 4, the computer device determines the vertical distances from the target waypoints to the contour of the obstacle according to the contour of the obstacle and the positions of the target waypoints; in response to the difference between the vertical distances from the target waypoints to the contour of the obstacle being less than or equal to the preset distance difference threshold, the computer device determines that the target waypoints in the contour of the obstacle belong to the same road; in response to the difference between the vertical distances from the target waypoints to the contour of the obstacle being greater than the preset distance difference threshold, the computer device determines that the target waypoints belong to different roads. With this method, whether the target waypoints belong to the same road can be determined, the target waypoint not belonging to the same road is deleted, and the target waypoint belonging to the same road is retained, so that the location result of the obstacle in the semantic map is more reasonable, accurate and reliable, and the driving strategy generated according to the semantic map in the automatic driving process is more accurate.

In S304, in response to the target waypoints included in the contour of the obstacle belonging to the same road, the target waypoints included in the contour of the obstacle are used as the position of the obstacle in the semantic map.

In some embodiments, the computer device may use the target waypoints included in the contour of the obstacle as the position of the obstacle in the semantic map in the case where the target waypoints included in the contour of the obstacle belong to the same road.

Optionally, the computer device may further perform screening on the target waypoints included in the contour of the obstacle when the target waypoints included in the contour of the obstacle belong to different roads and use the screened part of the target waypoints as the position of the obstacle in the semantic map. Optionally, the computer device may perform the screening according to the vertical distances from the target waypoints to the contour of the obstacle, delete a target waypoint with relatively large vertical distance deviation, and retain a target waypoint with relatively small vertical distance deviation as the position of the obstacle in the semantic map.

Optionally, a target waypoint not in the contour of the obstacle may also be deleted, and merely target waypoints in the contour of the obstacle are retained and used as the position of the obstacle in the semantic map.

In this embodiment, the computer device determines whether the target waypoints in the contour of the obstacle belong to the same road; in response to the target waypoints included in the contour of the obstacle belonging to the same road, the target waypoints included in the contour of the obstacle are used as the position of the obstacle in the semantic map. In this manner, some unreasonable target waypoints are screened out, making the location result of the obstacle in the semantic map more reasonable, accurate and reliable.

In an embodiment, the waypoints are stored and queried by using a data structure of a k-dimensional (KD) tree. In some embodiments, the data structure of the KD tree is adopted for storage and query, and waypoints may be hierarchically stored and queried from a plurality of dimensions, which can avoid locating the obstacle to invalid and wrong waypoints, thus making the screening of waypoints more accurate and efficient. Typically, a use of the data structure of the KD tree can make the location complete within one millisecond. Therefore, when the trajectory of the obstacle is predicted, the prediction trajectory of the obstacle can be obtained more accurately.

Optionally, on the basis of the various preceding embodiments, a breadth-first algorithm may also be adopted for the screening of waypoints.

Figure 5:
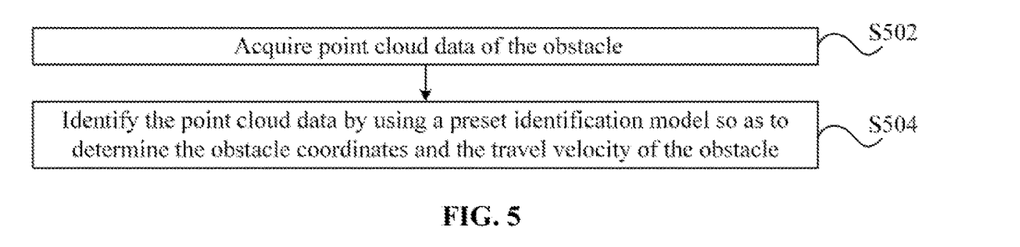
FIG. 5 is a flowchart of a method for locating an obstacle in a semantic map according to another embodiment.

FIG. 5 is a flowchart of a method for locating an obstacle in a semantic map according to another embodiment. This embodiment relates to a specific process in which the computer device acquires obstacle coordinates of an obstacle and a travel velocity of the obstacle. As shown in FIG. 2, the method includes a step of acquiring the obstacle coordinates of the obstacle and the travel velocity of the obstacle. Such step includes the steps described below.

In S502, point cloud data of the obstacle is acquired.

In some embodiments, the computer device can acquire the point cloud data of the obstacle detected by a laser radar. The point cloud data can characterize the state of the obstacle.

In S504, the point cloud data is identified by using a preset identification model so as to determine the obstacle coordinates and the travel velocity of the obstacle. The identification model is a model based on machine learning and an identification rule.

In some embodiments, the computer device can establish an identification model by adopting a machine learning algorithm combined with an identification rule, and the identification model is trained and debugged. In this manner, the point cloud data of the obstacle can be input into the identification model, and the obstacle coordinates of the obstacle and the travel velocity of the obstacle can be obtained. Optionally, the identification rule may be a rule obtained based on a historical identification result or manual annotation.

In this embodiment, the identification model is a model based on machine learning and the identification rule; the computer device acquires the point cloud data of the obstacle and identify the point cloud data by using the identification model so as to automatically determine the obstacle coordinates and the travel velocity of the obstacle, making acquisition of the obstacle coordinates and the travel velocity of the obstacle more accurate and efficient.

In an embodiment, after the point cloud data of the obstacle is acquired, the method further includes identifying the point cloud data by using the identification model so as to determine the contour of the obstacle. In some embodiments, the computer device may also identify the point cloud data by using the identification model so as to automatically determine the contour of the obstacle. With this method, the contour of the obstacle can be used as a consideration factor for location, making the location result of the obstacle in the semantic map more reasonable, accurate and reliable.

In order to facilitate the understanding of those skilled in the art, the technical solution of the present application is described below with an embodiment. For details, reference may be made to FIG. 6. The method includes the steps described below.

Figure 6:
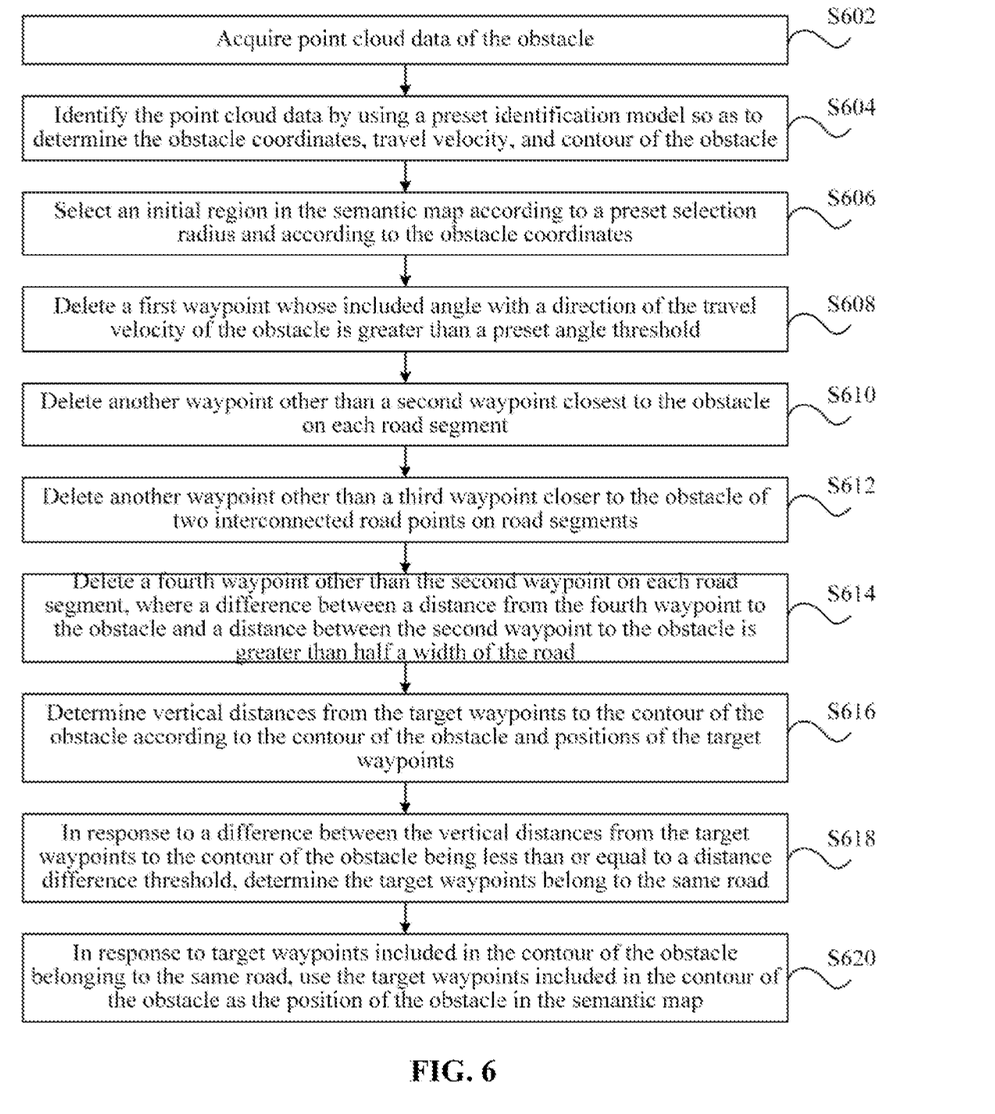
FIG. 6 is a flowchart of a method for locating an obstacle in a semantic map according to another embodiment.

In S602, point cloud data of the obstacle is acquired.

In S604, the point cloud data is identified by using a preset identification model so as to determine the obstacle coordinates, the travel velocity, and the contour of the obstacle.

In S606, an initial region is selected in the semantic map according to a preset selection radius and according to the obstacle coordinates. The initial region includes a plurality of waypoints configured to characterize a road distribution state in the initial region.

In S608, a first waypoint whose included angle with a direction of the travel velocity of the obstacle is greater than a preset angle threshold is deleted.

In S610, another waypoint other than a second waypoint closest to the obstacle on each road segment is deleted.

In S612, another waypoint other than a third waypoint closer to the obstacle of two interconnected waypoints on the plurality of road segments is deleted.

In S614, a fourth waypoint other than the second waypoint on each road segment is deleted, where a difference between a distance from the fourth waypoint to the obstacle and a distance between the second waypoint to the obstacle is greater than half a width of the road.

In S616, vertical distances from the target waypoints to the contour of the obstacle are determined according to the contour of the obstacle and positions of the target waypoints.

In S618, in response to a difference between the vertical distances from the target waypoints to the contour of the obstacle being less than or equal to a distance difference threshold, it is determined that the target waypoints belong to the same road.

In S620, in response to target waypoints included in the contour of the obstacle belonging to the same road, the target waypoints included in the contour of the obstacle are used as the position of the obstacle in the semantic map.

For the principle for and effect of implementing the steps in this embodiment, reference may be made to the description in the preceding embodiments and details are not repeated here.

It is to be understood that although various steps in the flowchart of each of FIGS. 2 to 6 are illustrated sequentially as indicated by arrows, the steps are not necessarily performed sequentially in the sequence indicated by the arrows. Unless expressly stated herein, there is no strict limit to the sequence in which the steps are performed, and the steps may be performed in other sequences. Moreover, at least a part of the steps in FIGS. 2 to 6 may include a plurality of sub-steps or a plurality of stages. These sub-steps or these stages are not necessarily performed at the same time, but may be performed at different time. These sub-steps or these stages are also not necessarily performed sequentially, but may take turns with at least a part of sub-steps or stages of other steps, or may be performed alternately with at least a part of sub-steps or stages of other steps.

Figure 7:
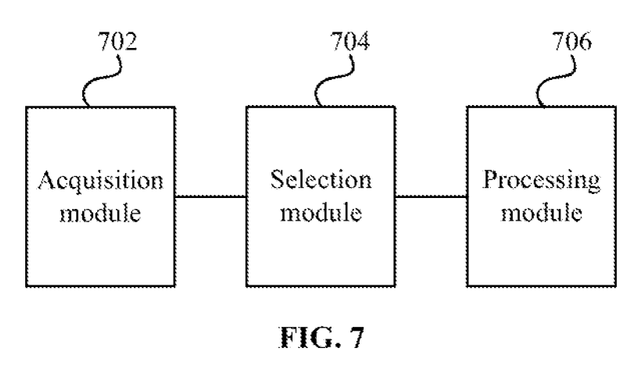
FIG. 7 is a structure diagram of an apparatus for locating an obstacle in a semantic map according to an embodiment.

An embodiment provides an apparatus for locating an obstacle in a semantic map, as shown in FIG. 7. The apparatus includes an acquisition module 702, a selection module 704, and a processing module 706.

The acquisition module 702 is configured to acquire obstacle coordinates of the obstacle and a travel velocity of the obstacle. The obstacle coordinates are configured to characterize a position of the obstacle on an actual road.

The selection module 704 is configured to select an initial region in the semantic map according to a preset selection radius and according to the obstacle coordinates. The initial region includes a plurality of waypoints configured to characterize a road distribution state in the initial region.

The processing module 706 is configured to perform screening on the plurality of waypoints in the initial region by using a preset screening rule so as to determine a target waypoint matching a position of the obstacle in the semantic map and configured to use the target waypoint as the position of the obstacle in the semantic map. The screening rule is a rule for performing the screening on the waypoints according to at least one of the travel velocity of the obstacle, directions of the waypoints, distances between the waypoints and the obstacle coordinates, distances between the waypoints, or a connectivity relationship between the waypoints.

In an embodiment, the screening rule includes at least one of the steps described below.

A waypoint whose included angle with a direction of the travel velocity of the obstacle is greater than a preset angle threshold is deleted.

Another waypoint other than a point closest to the obstacle on each road segment is deleted.

Another waypoint other than a point closer to the obstacle of two interconnected waypoints on the plurality of road segments is deleted.

A waypoint whose distance from the obstacle is greater than a distance from a waypoint closest to the obstacle to the obstacle in the semantic map and with such difference being greater than half a width of a road is deleted.

Figure 8:
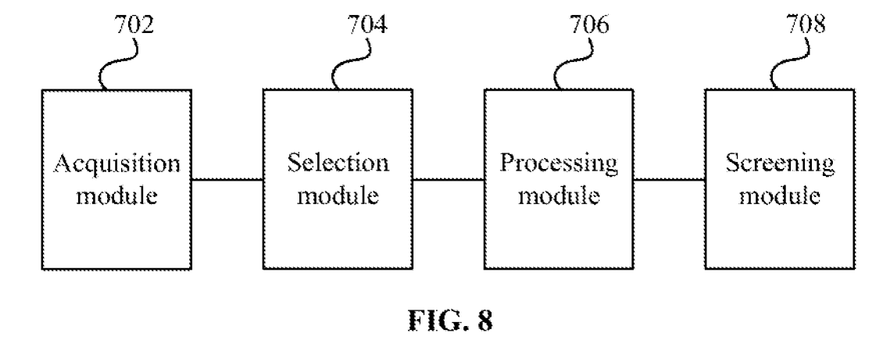
FIG. 8 is a structure diagram of an apparatus for locating an obstacle in a semantic map according to another embodiment.

In an embodiment, as shown in FIG. 8, the apparatus may further include a screening module 708.

The screening module 708 is configured to determine whether target waypoints in a contour of the obstacle belong to a same road and in response to the target waypoints included in the contour of the obstacle belonging to the same road, use the target waypoints included in the contour of the obstacle as the position of the obstacle in the semantic map.

In an embodiment, the screening module 708 may be configured to determine the vertical distances from the target waypoints to the contour of the obstacle according to the contour of the obstacle and the positions of the target waypoints; in response to the difference between the vertical distances from the target waypoints to the contour of the obstacle being less than or equal to the preset distance difference threshold, the screening module 708 may be configured to determine that the target waypoints belong to the same road; in response to the difference between the vertical distances from the target waypoints to the contour of the obstacle being greater than the preset distance difference threshold, the screening module 708 may be configured to determine that the target waypoints belong to different roads.

In an embodiment, the waypoints are stored by using a data structure of a KD tree.

In an embodiment, the acquisition module 702 may be configured to acquire the obstacle coordinates of the obstacle and the travel velocity of the obstacle, which includes the steps described below.

Point cloud data of the obstacle is acquired.

The point cloud data is identified by using a preset identification model so as to determine the obstacle coordinates and the travel velocity of the obstacle. The identification model is a model based on machine learning and an identification rule.

In an embodiment, the acquisition module 702 may be configured to identify the point cloud data by using the identification model so as to determine the contour of the obstacle.

For the specific limitation of the apparatus for locating an obstacle in a semantic map, reference may be made to the limitation of the method for locating an obstacle in a semantic map. Details are not repeated here. Various modules in the apparatus for locating an obstacle in a semantic map may be completely or partially implemented by software, hardware, or a combination thereof. Each module described above may be embedded in or independent of a processor in a computer device in a hardware form or stored in a memory in the computer device in a software form so that the processor can call and execute operations corresponding to each module described above.

An embodiment provides a computer device. The computer device includes a memory and a processor. The memory stores computer programs. When executing the computer programs, the processor implements the steps described below.

Obstacle coordinates of the obstacle and a travel velocity of the obstacle are acquired. The obstacle coordinates are configured to characterize a position of the obstacle on an actual road.

An initial region is selected in the semantic map according to a preset selection radius and according to the obstacle coordinates. The initial region includes a plurality of waypoints configured to characterize a road distribution state in the initial region.

Screening is performed on the plurality of waypoints in the initial region by using a preset screening rule so as to obtain a target waypoint matching a position of the obstacle in the semantic map, and the target waypoint is used as the position of the obstacle in the semantic map. The screening rule is a rule for performing the screening on the waypoints according to at least one of the travel velocity of the obstacle, directions of the waypoints, distances between the waypoints and the obstacle coordinates, distances between the waypoints, or a connectivity relationship between the waypoints.

In an embodiment, the screening rule includes at least one of the steps described below.

A first waypoint whose included angle with a direction of the travel velocity of the obstacle is greater than a preset angle threshold is deleted.

Another waypoint other than a second waypoint closest to the obstacle on each road segment is deleted.

Another waypoint other than a third waypoint closer to the obstacle of two interconnected waypoints on the plurality of road segments is deleted.

A fourth waypoint other than the second waypoint on each road segment is deleted, where a difference between a distance from the fourth waypoint to the obstacle and a distance between the second waypoint to the obstacle is greater than half a width of the road.

In an embodiment, when executing the computer programs, the processor further implements the steps described below.

It is determined whether target waypoints in a contour of the obstacle belong to a same road.

In response to the target waypoints included in the contour of the obstacle belonging to the same road, the target waypoints included in the contour of the obstacle are used as the position of the obstacle in the semantic map.

In an embodiment, when executing the computer programs, the processor further implements the steps described below.

Vertical distances from the target waypoints to the contour of the obstacle are determined according to the contour of the obstacle and positions of the target waypoints.

In response to a difference between the vertical distances from the target waypoints to the contour of the obstacle being less than or equal to a preset distance difference threshold, it is determined that the target waypoints belong to the same road.

In response to the difference between the vertical distances from the target waypoints to the contour of the obstacle being greater than the preset distance difference threshold, it is determined that the target waypoints belong to different roads.

In an embodiment, the waypoints are stored by using a data structure of a KD tree.

In an embodiment, when executing the computer programs, the processor further implements the steps described below.

Point cloud data of the obstacle is acquired.

The point cloud data is identified by using a preset identification model so as to determine the obstacle coordinates and the travel velocity of the obstacle. The identification model is a model based on machine learning and an identification rule.

In an embodiment, when executing the computer programs, the processor further implements the steps described below.

The point cloud data is identified by using the identification model so as to determine the contour of the obstacle.

It is to be appreciated that the process of executing the computer programs by the processor in the embodiment of the present application is consistent with the process of performing each step in the preceding method. For details, reference may be made to the description described above.

An embodiment provides a computer-readable storage medium which is configured to store computer programs. When a processor executes the computer programs, the steps described below are implemented.

Obstacle coordinates of the obstacle and a travel velocity of the obstacle are acquired. The obstacle coordinates are configured to characterize a position of the obstacle on an actual road.

An initial region is selected in the semantic map according to a preset selection radius and according to the obstacle coordinates. The initial region includes a plurality of waypoints configured to characterize a road distribution state in the initial region.

Screening is performed on the plurality of waypoints in the initial region by using a preset screening rule so as to obtain a target waypoint matching a position of the obstacle in the semantic map, and the target waypoint is used as the position of the obstacle in the semantic map. The screening rule is a rule for performing the screening on the waypoints according to at least one of the travel velocity of the obstacle, directions of the waypoints, distances between the waypoints and the obstacle coordinates, distances between the waypoints, or a connectivity relationship between the waypoints.

In an embodiment, the screening rule includes at least one of the steps described below.

A first waypoint whose included angle with a direction of the travel velocity of the obstacle is greater than a preset angle threshold is deleted.

Another waypoint other than a second waypoint closest to the obstacle on each road segment is deleted.

Another waypoint other than a third waypoint closer to the obstacle of two interconnected waypoints on the plurality of road segments is deleted.

A fourth waypoint other than the second waypoint on each road segment is deleted, where a difference between a distance from the fourth waypoint to the obstacle and a distance between the second waypoint to the obstacle is greater than half a width of the road.

In an embodiment, when the processor executes the computer programs, the steps described below are further implemented.

It is determined whether target waypoints in a contour of the obstacle belong to a same road.

In response to the target waypoints included in the contour of the obstacle belonging to the same road, the target waypoints included in the contour of the obstacle are used as the position of the obstacle in the semantic map.

In an embodiment, when the processor executes the computer programs, the steps described below are further implemented.

Vertical distances from the target waypoints to the contour of the obstacle are determined according to the contour of the obstacle and positions of the target waypoints.

In response to a difference between the vertical distances from the target waypoints to the contour of the obstacle being less than or equal to a preset distance difference threshold, it is determined that the target waypoints belong to the same road.

In response to the difference between the vertical distances from the target waypoints to the contour of the obstacle being greater than the preset distance difference threshold, it is determined that the target waypoints belong to different roads.

In an embodiment, the waypoints are stored by using a data structure of a KD tree.

In an embodiment, when the processor executes the computer programs, the steps described below are further implemented.

Point cloud data of the obstacle is acquired.

The point cloud data is identified by using a preset identification model so as to determine the obstacle coordinates and the travel velocity of the obstacle. The identification model is a model based on machine learning and an identification rule.

In an embodiment, when the processor executes the computer programs, the steps described below are further implemented.

The point cloud data is identified by using the identification model so as to determine the contour of the obstacle.

It is to be appreciated that the process of executing the computer programs by the processor in the embodiment of the present application is consistent with the process of performing each step in the preceding method. For details, reference may be made to the description described above.

It is to be understood by those having ordinary skill in the art that all or part of the processes in the methods of the embodiments described above may be completed by instructing related hardware through computer programs, the computer programs may be stored in a non-volatile computer-readable storage medium, and during the execution of the computer programs, the processes in the method embodiments described above may be included.

All references to the memory, storage, database, or other media used in the various embodiments provided in the present application may each include a non-volatile and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random-access memory (RAM) or an external cache. By way of illustration but not limitation, the RAM is available in multiple forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), a Rambus dynamic RAM (RDRAM), and the like. The technical features of the embodiments described above may be combined in any way. For the brevity of description, not all possible combinations of the technical features in the embodiments described above are described. However, as long as the combinations of these technical features do not conflict, these combinations shall be within the scope of the specification.

The preceding embodiments are merely several implementation modes of the present application. These embodiments are described in a specific and detailed manner but cannot be understood as a limit to the scope of the present application. It is to be noted that for those having ordinary skill in the art, several modifications and improvements may further be made without departing from the concept of the present application, and these modifications and improvements are within the scope of the present application. Therefore, the scope of the present application is defined by the appended claims.

What is claimed is:

1. A method for locating an obstacle in a semantic map, comprising:
    acquiring obstacle coordinates of the obstacle and a travel velocity of the obstacle, wherein the obstacle coordinates are configured to characterize a position of the obstacle on an actual road;
    selecting an initial region in the semantic map according to a preset selection radius and according to the obstacle coordinates, wherein a plurality of waypoints configured to characterize a road distribution state in the initial region are comprised in the initial region;
    performing screening on the plurality of waypoints in the initial region by using a preset screening rule so as to obtain a target waypoint matching a position of the obstacle in the semantic map; and
    using the target waypoint as the position of the obstacle in the semantic map;
    wherein the screening rule is a rule for performing the screening on the plurality of waypoints according to at least one of the travel velocity of the obstacle, directions of road segments on which the plurality of waypoints are located, distances between the plurality of waypoints and the obstacle coordinates, distances between the plurality of waypoints, or a connectivity relationship between the plurality of waypoints;
    wherein the method further comprises:
    determining vertical distances from the target waypoints to the contour of the obstacle according to the contour of the obstacle and positions of the target waypoints;
    in response to a difference between the vertical distances from the target waypoints to the contour of the obstacle being less than or equal to a preset distance difference threshold, determining that the target waypoints belong to the same road;
    in response to the difference between the vertical distances from the target waypoints to the contour of the obstacle being greater than the preset distance difference threshold, determining that the target waypoints belong to different roads; and
    in response to the target waypoints comprised in the contour of the obstacle belonging to the same road, using the target waypoints comprised in the contour of the obstacle as the position of the obstacle in the semantic map;
    wherein the screening rule comprises at least one of the following steps:
    deleting a first waypoint, wherein the first waypoint is located on a first road segment, and an included angle between a direction of the first road segment and a direction of the travel velocity is greater than a preset angle threshold;
    deleting another waypoint other than a second waypoint on each road segment, wherein the second waypoint is a point closest to the obstacle within the plurality of waypoints;
    deleting another waypoint other than a third waypoint on a plurality of road segments, wherein the third waypoint is a point closest to the obstacle within ones of the plurality of waypoints who connect with each other; or
    deleting a fourth waypoint other than the second waypoint on each road segment, wherein a difference between a distance from the third waypoint to the obstacle and a distance between the second waypoint to the obstacle is greater than half a width of the road.

2. The method of claim 1, wherein the plurality of waypoints are stored by using a data structure of a k-dimensional (KD) tree.

3. The method of claim 2, wherein acquiring the obstacle coordinates of the obstacle and the travel velocity of the obstacle comprises:
    acquiring point cloud data of the obstacle; and
    identifying the point cloud data by using a preset identification model so as to determine the obstacle coordinates and the travel velocity of the obstacle, wherein the identification model is a model based on machine learning and an identification rule.

4. The method of claim 3, wherein after acquiring the point cloud data of the obstacle, the method 30 further comprises:
    identifying the point cloud data by using the identification model so as to determine the contour of the obstacle.

5. An apparatus for locating an obstacle in a semantic map, comprising a memory and a processor, wherein the memory is configured to store computer programs, and the processor is configured to, when executing the computer programs, implement:
    an acquisition module, which is configured to acquire obstacle coordinates of the obstacle and a travel velocity of the obstacle, wherein the obstacle coordinates are configured to characterize a position of the obstacle on an actual road;
    a selection module, which is configured to select an initial region in the semantic map according to a preset selection radius and according to the obstacle coordinates, wherein a plurality of waypoints configured to characterize a road distribution state in the initial region are comprised in the initial region; and
    a processing module, which is configured to perform screening on the plurality of waypoints in the initial region by using a preset screening rule so as to obtain a target waypoint matching a position of the obstacle in the semantic map and configured to use the target waypoint as the position of the obstacle in the semantic map, wherein the screening rule is a rule for performing the screening on the plurality of waypoints according to at least one of the travel velocity of the obstacle, directions of a road on which the plurality of waypoints are located, distances between the plurality of waypoints and the obstacle coordinates, distances between the plurality of waypoints, or a connectivity relationship between the plurality of waypoints;
    wherein the apparatus further comprises:
    a screening module, which is configured to determine vertical distances from the target waypoints to the contour of the obstacle according to the contour of the obstacle and positions of the target waypoints; in response to a difference between the vertical distances from the target waypoints to the contour of the obstacle being less than or equal to a preset distance difference threshold, determine that the target waypoints belong to the same road; in response to the difference between the vertical distances from the target waypoints to the contour of the obstacle being greater than the preset distance difference threshold, determine that the target waypoints belong to different roads; and in response to the target waypoints comprised in the contour of the obstacle belonging to the same road, use the target waypoints comprised in the contour of the obstacle as the position of the obstacle in the semantic map;

wherein the screening rule comprises at least one of the following:

deleting a first waypoint, wherein the first waypoint is located on a first road segment, and an included angle between a direction of the first road segment and a direction of the travel velocity is greater than a preset angle threshold;

deleting another waypoint other than a second waypoint on each road segment, wherein the second waypoint is a point closest to the obstacle within the plurality of waypoints;

deleting another waypoint other than a third waypoint on a plurality of road segments, wherein the third waypoint is a point closest to the obstacle within ones of the plurality of waypoints who connect with each other; or deleting a fourth waypoint other than the second waypoint on each road segment, wherein a difference between a distance from the third waypoint to the obstacle and a distance between the second waypoint to the obstacle is greater than half a width of the road.

6. A non-transitory computer-readable storage medium having computer programs stored thereon, wherein when the computer programs are executed by a processor, steps of the method of claim 1 are implemented.

* * * * *